INVENTORS
GEORGE M. EGART
WALTER FREESE, DECEASED
BY EVELYN FREESE, EXECUTRIX.

Mann, Brown & McWilliams
Attorneys.

United States Patent Office 3,458,772
Patented July 29, 1969

3,458,772
ELECTRONIC TIME DELAY RELAY
George M. Egart, 202 N. Merrill, Park Ridge, Ill. 60068, and Walter Freese, deceased, late of Munster, Ind., by Evelyn Freese, administratrix of the estate of said Walter Freese, 8201 Greenwood St., Munster, Ind. 46231
Filed May 2, 1966, Ser. No. 547,713
Int. Cl. H01h 47/18, 47/32, 33/59
U.S. Cl. 317—142                             7 Claims

ABSTRACT OF THE DISCLOSURE

A timing circuit for energizing a relay in which an input signal initially energizes a relay and charges a condenser so that after cessation of the input signal the condenser supplies a voltage to maintain energization of the relay. The input signal and condenser energize the relay through a cascaded arrangement of transistors. The input signal line for charging the condenser and thereafter initialy triggering the transistors to energize the relay is separate from the voltage which energizes the relay.

---

The present invention is directed to certain new and useful improvements in electronic time delay mechanisms and particularly mechanisms of the type which will provide for control of a load circuit in response to an input signal.

The major purposes of the invention are to provide a time delay circuit of the foregoing class through simplified electrical means, to so arrange such a circuit that the circuit will always provide for energization of the output circuit in a failsafe manner, and to provide such a circuit with variable means which provide for a variable and preselected time interval of energization of the load circuit following cessation of the input signal, these and other objects of the invention being more fully set out in the following specification and claims when taken with the accompanying drawings, in which:

Like elements are designated by like characters throughout the specification and drawings.

Figure 1:
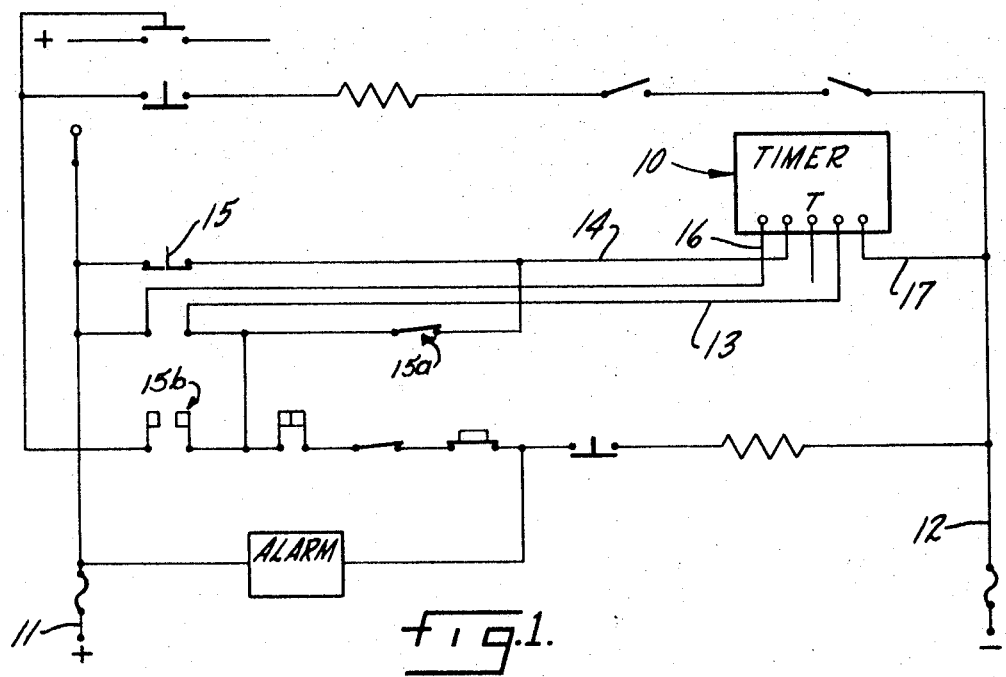
FIGURE 1 is a schematic view of an output circuit which may be controlled through use of one embodiment of the present invention.

With particular reference now to the drawings and in the first instance to FIGURE 1, the numeral 10 generaly designates a timing circuit employing the principles illustrated in FIGURE 2 and to be described hereinafter. As shown in FIGURE 1, the timing unit 10 is connected to a control circuit for a steam generator of the type which may be used to heat railway cars. It should be understood that the circuit of FIGURE 1, apart from its use with the timing unit 10 to control certain output circuits therein, is not to be considered a part of the invention. The control circuit illustrated generally in FIGURE 1 includes lines 11 and 12 connected to a power source and various control switches for controlling the firing of the steam generator unit as generally illustrated in FIGURE 1. In the arrangement shown in FIGURE 1, the timing unit 10 may be connected so as to energize an output circuit 13 during the presence of an input signal as provided by energization of circuit line 14 and to maintain circuit 13 energized for a predetermined time interval after the signal through line 14 ceases. It may cease, for example, under control of switch 15 or a servo switch 15a. Circuit 13 in turn operates various switches controlling the operation of the steam generator. Switch 15 may open to stop the signal through line 14 when the steam generator starts firing. Circuit 13, during the predetermined time interval, holds the steam generator run circuit through the line relay closed and the generator continues to fire. When the stack switch 15b closes due to heat of combustion gases in the stack, the generator continues to run after the time delay relay opens. If, however, the stack fails to heat in the predetermined time period, indicating a failure to fire properly, the timer opens, the line relay drops out, and the generator stops.

Figure 2:
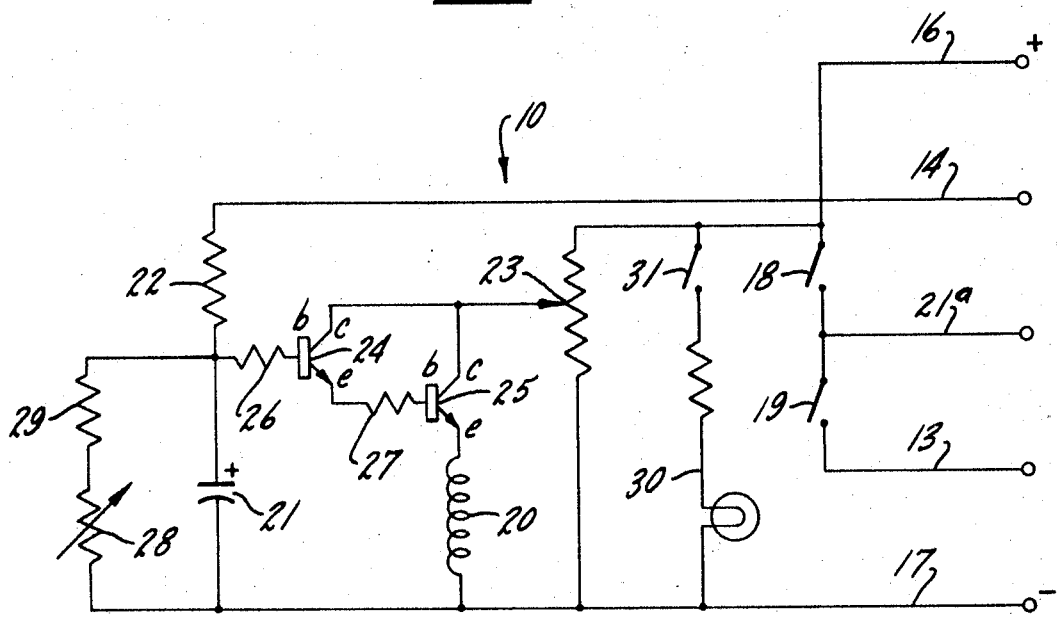
FIGURE 2 is a circuit diagram of one embodiment of the time constituting the present invention.

As particularly illustrated in FIGURE 2, the timing circuit has power lines 16 and 17 which are connected across the D.C. power lines 11 and 12, respectively. Line 16 is connectable to the load circuit 13 through switch contacts 18 and 19 which are adapted to close when a relay 20 is energized. Line 21a may be used to test the operability of the circuit. The timing circuit to FIGURE 2 provides a line connecting the input signal circuit 14 to a condenser 21. Condenser 21 is connected across lines 14 and 17 so as to charge this condenser whenever the signal is supplied through line 14. One or more resistances 22 may be in the input signal line so as to limit the amount of current imposed upon the condenser 21.

Relay 20 is connected between lines 17 and 16 through a voltage divider 23 so as to reduce the voltage passed to the relay 20. In order to control the energization of relay 20, a pair of transistors 24 and 25 are placed in series and connected between the resistance 22 and condenser 21 so that their bases are energized during the presence of an input signal through line 14 or by discharge of condenser 21. As shown, transistor 24, when its base is energized allows current flow to the base of transistor 25 and transistor 25 in turn will then allow passage of current via its collector and emitter to the relay 20. Resistances 26 and 27 may be in the lines leading to each base of each transistor to limit the current from condenser 21.

In order to vary the discharge rate from the condenser 21, a variable resistance or potentiometer 28 is placed in parallel with condenser 21 and an additional resistance 29 may be in this same parallel circuit.

An auxiliary circuit such as the pilot light circuit generally designated at 30 may be placed across the lines 17 and 16 and have switch contacts 31 closed by relay 20 during energization of relay 20. The circuit 30 is energized when the relay is energized. Line 21a may be used to test the operability of the circuit when the pilot light of circuit 30 is burned out.

In operation, the energization of line 14 provides an input signal which in turn charges condenser 21 and at the same time provides for energization of the base of transistor 24. This in turn allows energization of the base of transistor 25 so that current passes to the coil of relay 20. Relay 20 then closes switch contacts 18, 19 and 31 so that the pilot light circuit is on while the load circuit represented by the circuit 13 is energized. When the signal through line 14 ceases, condenser 21 will then commence to discharge and will maintain the base of transistor 24 energized to in turn energize the base of transistor 25 and allow the maintenance of current flow to relay 20. Thus current flow to relay 20 will be maintained for a predetermined period of time after the signal from line 14 ceases. The amount of time may be varied by adjusting the amount of resistance provided by a variable resistor or potentionmeter 28. For example, if condenser 21 is charged with approximately 74 volts from the source, the time interval may be varied between approximately 25 and 65 seconds.

Through use of the transistors connected in series as shown, relatively little condenser current is required to cause energization of the relay by means of the larger current from the source. This allows the use of relatively small condensers. For example, transistor 24 needs but a small amount of current to energize its base so as to allow a larger current flow to the base of transistor 25. This current flow to the base of transistor 25 allows a still larger amount of current flow to relay coil 20. It should be noted that the power which energizes the relay coil 20 does not come from the condenser 21. The power from the condenser 21 is used only to more or less "trigger" the transistors to allow the larger current flow. By using more than two transistors in the same general fashion illustrated, relatively larger amounts of power can be controlled.

The system provides what is in effect a failsafe and positive energization of the circuit for a predetermined time interval after the control or input signal ceases in that the condenser is always charged upon cessation of the signal and the only place for the energy of the condenser to go is to the bases of the transistors for continued energization of relay 20. The condenser, disconnected from continuous power, must dissipate its energy by leaking current through 26 in the predetermined time. The decline, in energy, after a preselected time interval, will allow the relay 20 to drop out.

Figure 3:
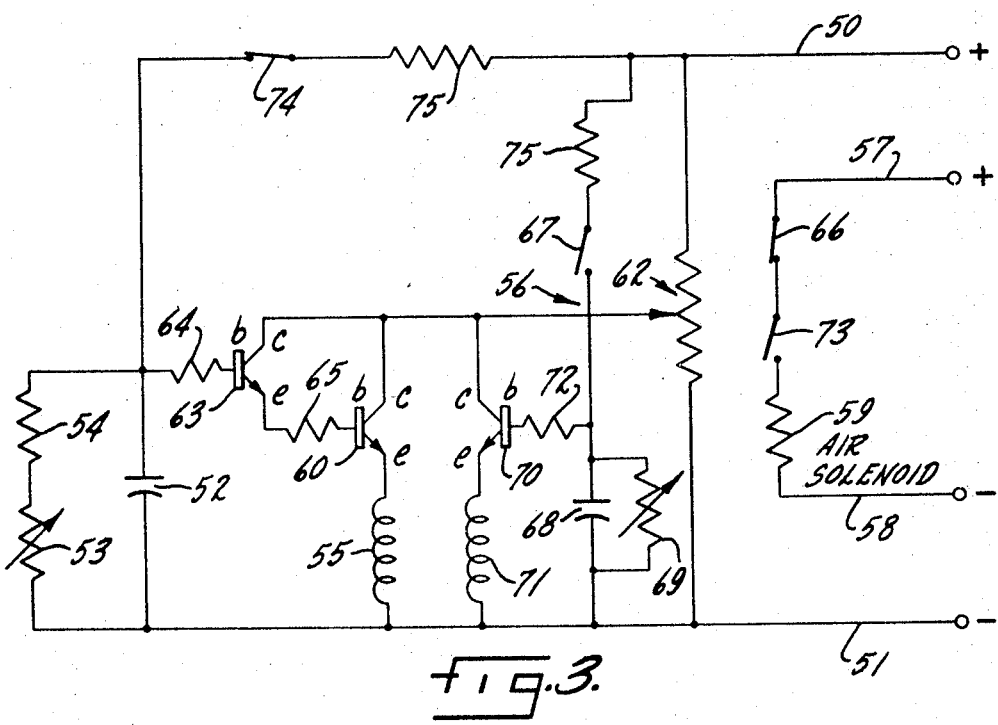
FIGURE 3 is a circuit diagram of another embodiment of timer utilizing principles of the present invention.

FIGURE 3 illustrates another embodiment which utilizes simple circuitry to provide a variable period of energization of a load circuit following a predetermined time delay. In FIGURE 3 an input signal is provided by D.C. power lines 50 and 51 which are connected to charge a condenser 52. The time period of discharge of the condenser is under control of the variable resistor 53 which is disposed in parallel with condenser 52. One or more resistances 54 may be in the variable resistance line. In FIGURE 3, discharge from the condenser is utilized to energize a relay 55 which, in turn, actuates a control circuit generally designated at 56, which in turn controls energization of the load circuit generally represented by the power lines 57 and 58. The load circuit may include, for example, a solenoid 59 which controls a blow-down valve in a steam generator.

Relay 55 is energized from a transistor 60 having its collector and emitter connected across line 51 and through a voltage divider circuit generally designated at 62 to line 50. The base of transistor 60 is triggered or energized from a second transistor 63 which has its base energized from condenser 52 or from the power lines 50 and 51. A limiting resistance 64 may be in the line leading to the base of transistor 63 and a limiting resistance 65 may be in the line leading to the base of transistor 60. The collector and emitter of transistor 63 connected across the base and collector of transistor 60 as is the case with the arrangement illustrated in FIGURE 2.

Relay 55 controls normally closed contacts 66 in the load circuit as well as normally open contacts 67 in the control circuit. When relay 55 is energized, contacts 66 are open while contacts 67 are closed and vice versa.

The control circuit 56 is connected across the lines 50 and 51 so as to charge a second condenser 68 in the control circuit. A variable resistor 69, which is parallel with the condenser 68, may be adjusted so as to vary the interval of discharge time of condenser 68 in a manner similar to the control of discharge time of condenser 52 by variable resistor 53. A transistor 70 has its emitter and collector connected across the voltage divider and line 51 and is utilized to energize a second relay 71 when the base of the transistor is energized, as through its base connection to the control circuit 56 and to condenser 68. A limiting resistor 72 may be in the line leading to the base of transistor 70.

Relay 71, when energized, closes normally open switch contacts 73 in the load circuit and opens normally closed contacts 74 in power line 50. One or more limiting resistances, as desired, may be utilized in the line 50 as indicated by the resistance 75.

In use, the power lines or input circuit provide an input signal whenever switch contacts 74 are closed. This charges condenser 52. Also, when switch contacts 74 are closed, a relatively small amount of current triggers transistor 63 which, in turn, triggers the transistor 60 to energize relay 55. This opens switch contacts 66 in the load circuit and closes contacts 67 in the control circuit. Upon closing of switch contacts 67, power is supplied to charge condenser 68 and at the same time transistor 70 is triggered so as to energize relay 71, thereby opening switch contacts 74 a predetermnied interval of time after the initiation of the input signal which charges condenser 52. At the same time that switch contacts 74 open, relay 71 closes switch contacts 73 of the load circuit.

Upon opening of switch contacts 74, condenser 52 begins to discharge and continues to energize the base of transistor 63 so that the relay 55 is maintained energized for a pre-determined interval of time which is under control of the length of discharge time of the condenser 52. This time interval may be on the order of ten minutes. When the discharge from condenser 52 becomes so feeble that the transistors 63 and 60 are not energized sufficiently to maintain relay 55 energized, switch contacts 66 then close and switch contacts 67 open. It may be noted that all this time, the load circuit is still not energized due to the fact that one or the other of switch contacts 66 and 73 are open. Closure of the switch contacts 66 complete the circuit to the solenoid 59 so that the load circuit is then energized. The power to the control circuit is thus broken by opening switch contacts 67 but the transistor 70 which controls relay 71, continues to energize relay 71 due to discharge from condenser 68. The condenser 68 will maintain the load circuit energized for a predetermined interval of time which may be controlled by the variable resistor 69. This condenser, for example, may be set to provide for a five second interval of discharge following deenergization of relay 55. This provides for a preselected time interval of energization of the load circuit following a preselected time interval as governed by condenser 52. After this interval of energization of the load circuit and when the signal from condenser 68 becomes too feeble to maintain energization of relay 71 switch contacts 74 close and switch contacts 73 open to thereby begin another cycle of a predetermined time delay as governed by condenser 52, followed by a predetermined interval of energization of the load circuit so that the system as shown is self-cycling.

Of course, the load terminals 57 and 58 may be supplied from the same source as that which supplies the lines 50 and 51 so that in effect the load circuit represented by lines 57 and 58 may be considered as connected across the lines 50 and 51.

As in the case with the system in FIGURE 2, transistor 63 needs but a small amount of current to energize its base so as to allow larger current flow to transistor 60 and a still larger amount of current to relay 55. This arrangement allows the condenser 52 to bleed off slowly and provide a relatively large time interval such as on the order of ten minutes. As in the case with the system in FIGURE 2, the time interval of discharge of condenser 52 may be varied by varying the resistance 53 as well as the resistance value of resistance 54.

Whereas we have shown and described an operative form of the invention, it should be understood that this showing and description thereof should be taken in an illustrative or diagrammatic sense only. There are many modifications in and to the invention which will fall within the scope and spirit thereof and which will be apparent to those skilled in the art. The scope of the invention should be limited only by the scope of the hereinafter appended claims.

We claim:
1. A timer circuit for controlling a load circuit in response to an input signal including circuit means for energizing a load circuit and relay means for controlling the energization thereof, a condenser connected to an input signal circuit to allow charging of the condenser in response to an input signal, means for energizing said relay means in response to the presence of said input signal and in response to discharge from said condenser to thereby provide a predetermined time interval of energization of said relay means after cessation of said signal and in response to discharge of said condenser, an auxiliary control circuit in said circuit means and formed and adapted for energization in response to energization of said relay means, said auxiliary control circuit including additional relay means for completing said load circuit and for holding said load circuit energized for a predetermined interval of time after deenergization of said first named relay means.

2. The structure of claim 1 wherein said auxiliary control circuit includes a second condenser formed and adapted to be charged during energization of said first named relay means and to discharge power to said second relay means after deenergization of said first named relay means.

3. A timer circuit for controlling a load circuit in response to an input signal including circuit means for energizing a load circuit and a relay for controlling the energization thereof, an input signal line connected to a voltage source, a condenser connected to said input signal circuit line to allow charging of the condenser in response to an input signal, a voltage supply circuit connected to said voltage source, means in said supply circuit for reducing the voltage therein below the voltage of said source, plural transistors connected with said supply circuit and with one transistor connected to energize the base of another transistor, said one transistor having its collector and emitter connected to said supply circuit and to the base of said other transistor, said other transistor having its emitter and collector connected to said voltage supply circuit and said relay, said input signal line having branch connections to the base of said one transistor and to said condenser to thereby charge said condenser and by energizing the base of said one transistor allowing current to pass from said supply circuit through both transistors and to said relay while allowing said condenser to energize both transistors and said relay for a predetermined time interval after cessation of energization of said input signal line.

4. The circuit of claim 3 wherein said means in said supply circuit for reducing the voltage therein is a voltage divider, and an adjustable resistance is placed across said condenser to thereby provide adjustment of the time interval.

5. The circuit of claim 4 wherein said input signal line is connected across said voltage source.

6. A timer circuit for controlling a load circuit in response to an input signal including circuit means for energizing a load circuit and a relay for controlling the energization thereof, an input signal line, a condenser connected to said input signal line to allow charging of the condenser in response to an input signal, a voltage supply circuit, a voltage divider in said supply circuit for reducing the voltage therein, plural transistors connected with said supply circuit and with one transistor connected to energize the base of another transistor, said one transistor having its collector and emitter connected to said supply circuit and to the base of said other transistor, said other transistor having its emitter and collector connected to said voltage supply circuit and said relay, said input signal line having branch connections to the base of said one transistor and to said condenser to thereby charge said condenser and by energizing the base of said one transistor allowing current to pass from said supply circuit through both transistors and to said relay while allowing said condenser to energize both transistors and said relay for a predetermined time interval after cessation of energization of said input signal line, and an adjustable resistance connected across said condenser to thereby provide an adjustment of the time interval.

7. The structure of claim 6 wherein said relay means controls said load circuit through an auxiliary control circuit which is energized to response to energization of said relay means, said auxiliary control circuit including additional relay means for completing said load circuit and for holding said load circuit energized for a predetermined interval of time after deenergization of said first named relay means.

References Cited

UNITED STATES PATENTS

| | | | |
|---|---|---|---|
| 2,969,486 | 1/1961 | Amfahr | 317—148.5 |
| 2,981,898 | 4/1961 | St. John. | |
| 3,049,627 | 8/1962 | Higginbotham. | |
| 3,082,329 | 3/1963 | Meyer et al. | |
| 3,144,568 | 8/1964 | Silliman et al. | 317—142 X |
| 3,163,803 | 12/1964 | Luckadoo | 317—142 |
| 3,215,856 | 12/1965 | Moser et al. | |
| 3,246,209 | 4/1966 | Multabi et al. | 317—142 |

LEE T. HIX, Primary Examiner

U.S. Cl. X.R.

307—141.4, 254, 315; 317—148.5

PO-1050
(5/69)

UNITED STATES PATENT OFFICE
CERTIFICATE OF CORRECTION

Patent No. 3,458,772     Dated July 29, 1969

Inventor(s) George M. Egart et al

It is certified that error appears in the above-identified patent and that said Letters Patent are hereby corrected as shown below:

Column 6, line 31, for "to" first occurrence, read -- in --.

SIGNED AND
SEALED

MAR 3 1 1970

(SEAL)
Attest:

Edward M. Fletcher, Jr.
Attesting Officer

WILLIAM E. SCHUYLER, JR.
Commissioner of Patents